(12) United States Patent
Sekine

(10) Patent No.: US 10,917,533 B2
(45) Date of Patent: Feb. 9, 2021

(54) INFORMATION PROCESSING APPARATUS

(71) Applicant: FUJI XEROX CO., LTD., Tokyo (JP)

(72) Inventor: Yoshihiro Sekine, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/533,800

(22) Filed: Aug. 7, 2019

(65) Prior Publication Data

US 2020/0267271 A1 Aug. 20, 2020

(30) Foreign Application Priority Data

Feb. 19, 2019 (JP) ................. 2019-027735

(51) Int. Cl.
*G06F 3/048* (2013.01)
*H04N 1/00* (2006.01)

(52) U.S. Cl.
CPC ..... *H04N 1/00427* (2013.01); *H04N 1/00421* (2013.01); *H04N 1/00424* (2013.01); *H04N 1/00429* (2013.01)

(58) Field of Classification Search
None
See application file for complete search history.

(56) References Cited

U.S. PATENT DOCUMENTS

| | | | | |
|---|---|---|---|---|
| 6,005,567 A * | 12/1999 | Nielsen | ................ | G06F 16/958 715/823 |
| 6,567,627 B2 * | 5/2003 | Maeda | ................ | H04N 1/00352 399/81 |
| 6,587,217 B1 * | 7/2003 | Lahey | ................ | G06F 3/1205 358/1.15 |
| 6,978,095 B2 * | 12/2005 | Kato | ................ | G03G 15/5075 358/1.15 |
| 7,503,013 B2 * | 3/2009 | Donoghue | ........ | H04N 5/44543 715/810 |
| 9,021,391 B2 * | 4/2015 | Kong | ................ | H04N 1/00 715/810 |
| 9,998,617 B2 | 6/2018 | Shinohara | | |
| 2002/0080376 A1 * | 6/2002 | Momose | ................ | G06K 15/00 358/1.9 |
| 2002/0126322 A1 * | 9/2002 | Kadowaki | ........ | H04N 1/00395 358/440 |
| 2004/0036779 A1 * | 2/2004 | Cazier | ................ | H04N 1/00509 348/231.2 |
| 2004/0100504 A1 * | 5/2004 | Sommer | ................ | G06F 3/0482 715/810 |
| 2004/0210840 A1 * | 10/2004 | Park | ................ | G06F 3/1284 715/272 |
| 2005/0111866 A1 * | 5/2005 | Sato | ................ | G03G 15/502 399/79 |

(Continued)

FOREIGN PATENT DOCUMENTS

| | | |
|---|---|---|
| JP | 2007157111 | 6/2007 |
| JP | 2012123475 | 6/2012 |
| JP | 2017130014 | 7/2017 |

*Primary Examiner* — Hua Lu
(74) *Attorney, Agent, or Firm* — JCIPRNET

(57) ABSTRACT

An information processing apparatus includes a display unit that displays a screen and a display control unit that, if an operator selects one of a predetermined number of setting items displayed in a first display part of the screen, displays the predetermined number of setting items other than the setting item selected by the operator in the first display part and setting information corresponding to the setting item selected by the operator in a second display part of the screen.

10 Claims, 10 Drawing Sheets

(56) References Cited

U.S. PATENT DOCUMENTS

| | | | |
|---|---|---|---|
| 2005/0190405 A1* | 9/2005 | Tomita | G06F 3/1285 358/1.18 |
| 2006/0092453 A1* | 5/2006 | Okada | H04N 1/00482 358/1.14 |
| 2006/0143286 A1* | 6/2006 | Aoki | H04N 1/00209 709/220 |
| 2006/0187483 A1* | 8/2006 | Baba | H04N 1/00503 358/1.15 |
| 2007/0067740 A1* | 3/2007 | Seo | G06F 3/0482 715/825 |
| 2007/0130538 A1* | 6/2007 | Chiu | G06F 16/958 715/792 |
| 2007/0226261 A1* | 9/2007 | Urita | G06F 3/0482 |
| 2008/0049247 A1* | 2/2008 | Asai | B42C 19/02 358/1.15 |
| 2008/0115059 A1* | 5/2008 | Sakai | G06F 3/1231 715/700 |
| 2008/0195663 A1* | 8/2008 | Sekine | G03G 15/502 |
| 2008/0294983 A1* | 11/2008 | Hoshino | G06F 40/174 715/273 |
| 2009/0265625 A1* | 10/2009 | Tamai | H04N 1/00408 715/274 |
| 2010/0064256 A1* | 3/2010 | Esaki | H04N 1/4413 715/825 |
| 2010/0241507 A1* | 9/2010 | Quinn | G06Q 30/0244 705/14.42 |
| 2011/0096348 A1* | 4/2011 | Ebi | H04N 1/00413 358/1.14 |
| 2011/0273735 A1* | 11/2011 | Koura | G03G 15/5016 358/1.13 |
| 2011/0276507 A1* | 11/2011 | O'Malley | G06Q 30/00 705/321 |
| 2014/0022598 A1* | 1/2014 | Neeleman | G06F 3/1257 358/1.15 |
| 2014/0089826 A1* | 3/2014 | Boyd | G11B 27/031 715/765 |
| 2014/0096065 A1* | 4/2014 | Kumamoto | G06F 3/0482 715/779 |
| 2014/0115512 A1* | 4/2014 | Sekine | G06F 3/04883 715/769 |
| 2014/0281969 A1* | 9/2014 | Kumar | G06F 3/0482 715/711 |
| 2015/0169603 A1* | 6/2015 | Klappert | G06F 16/532 700/98 |
| 2017/0251114 A1* | 8/2017 | Ichiyama | H04N 1/00506 |
| 2020/0026397 A1* | 1/2020 | Wohlstadter | G16C 20/10 |

* cited by examiner

FIG. 6

| SETTING ITEM | PRIORITY LEVEL 1 | PRIORITY LEVEL 2 | PRIORITY LEVEL 3 | PRIORITY LEVEL 6 | PRIORITY LEVEL 5 | PRIORITY LEVEL 6 |
|---|---|---|---|---|---|---|
| Color Mode | Reduce/Enlarge | Paper Supply | Preview | | | |
| 2 Sided Copying | N-up | Color Mode | Preview | Reduce/Enlarge | Paper Supply | |
| Paper Supply | Reduce/Enlarge | Preview | Color Mode | | | |
| Reduce/Enlarge | Paper Supply | Preview | Color Mode | | | |
| Original Type | Paper Supply | Reduce/Enlarge | Preview | | | |
| Preview | | | | Reduce/Enlarge | | |
| N-up | 2 Sided Copying | Color Mode | | Paper Supply | Preview | |
| ... | | | | | | |

INFORMATION PROCESSING APPARATUS

CROSS-REFERENCE TO RELATED APPLICATIONS

This application is based on and claims priority under 35 USC 119 from Japanese Patent Application No. 2019-027735 filed Feb. 19, 2019.

BACKGROUND

(i) Technical Field

The present disclosure relates to an information processing apparatus.

(ii) Related Art

A method for building a website interface including determining feature colors of the website interface including a first number, covering a screen with several sub-panes including a second number obtained by dividing a screen area into the sub-panes, and designing each of the feature colors for one of the sub-panes has been disclosed. The second number is equal to or larger than the first number (refer to Japanese Unexamined Patent Application Publication No. 2007-157111).

SUMMARY

In some situations, a plurality of setting items are displayed, and an operator selects one of the plurality of setting items. After content of the setting item selected by the operator is displayed, another setting item might be hidden as a result of the display of the content. In this case, the operator scrolls a screen in order to check the other setting item.

Aspects of non-limiting embodiments of the present disclosure relate to reduction of an operation for checking a setting item performed by an operator compared to when a setting item is hidden after an operator selects one of a plurality of setting items and content of the selected setting item is displayed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a display unit that displays a screen and a display control unit that, if an operator selects one of a predetermined number of setting items displayed in a first display part of the screen, displays the predetermined number of setting items other than the setting item selected by the operator in the first display part and setting information corresponding to the setting item selected by the operator in a second display part of the screen.

BRIEF DESCRIPTION OF THE DRAWINGS

An exemplary embodiment of the present disclosure will be described in detail based on the following figures, wherein:

FIG. 6 is a diagram illustrating an example of information indicating levels of relevance between each setting item and other setting items;

DETAILED DESCRIPTION

An exemplary embodiment of the present disclosure will be described in detail hereinafter with reference to the accompanying drawings.

Hardware Configuration of Image Processing Apparatus

First, the hardware configuration of an image processing apparatus 100 according to the present exemplary embodiment will be described.

The image processing apparatus 100 according to the present exemplary embodiment has various image processing functions such as a print function, a scan function, a copy function, and a facsimile (hereinafter referred to as "fax") function and performs image processing. For example, the image processing apparatus 100 performs printing by forming an image on a sheet of paper using the print function. The image processing apparatus 100 also receives image data using the fax function. The image processing apparatus 100 performs printing on the basis of the received image data or transmits the image data to another apparatus.

In the present exemplary embodiment, the image processing apparatus 100 is used as an example of an information processing apparatus.

Figure 1:
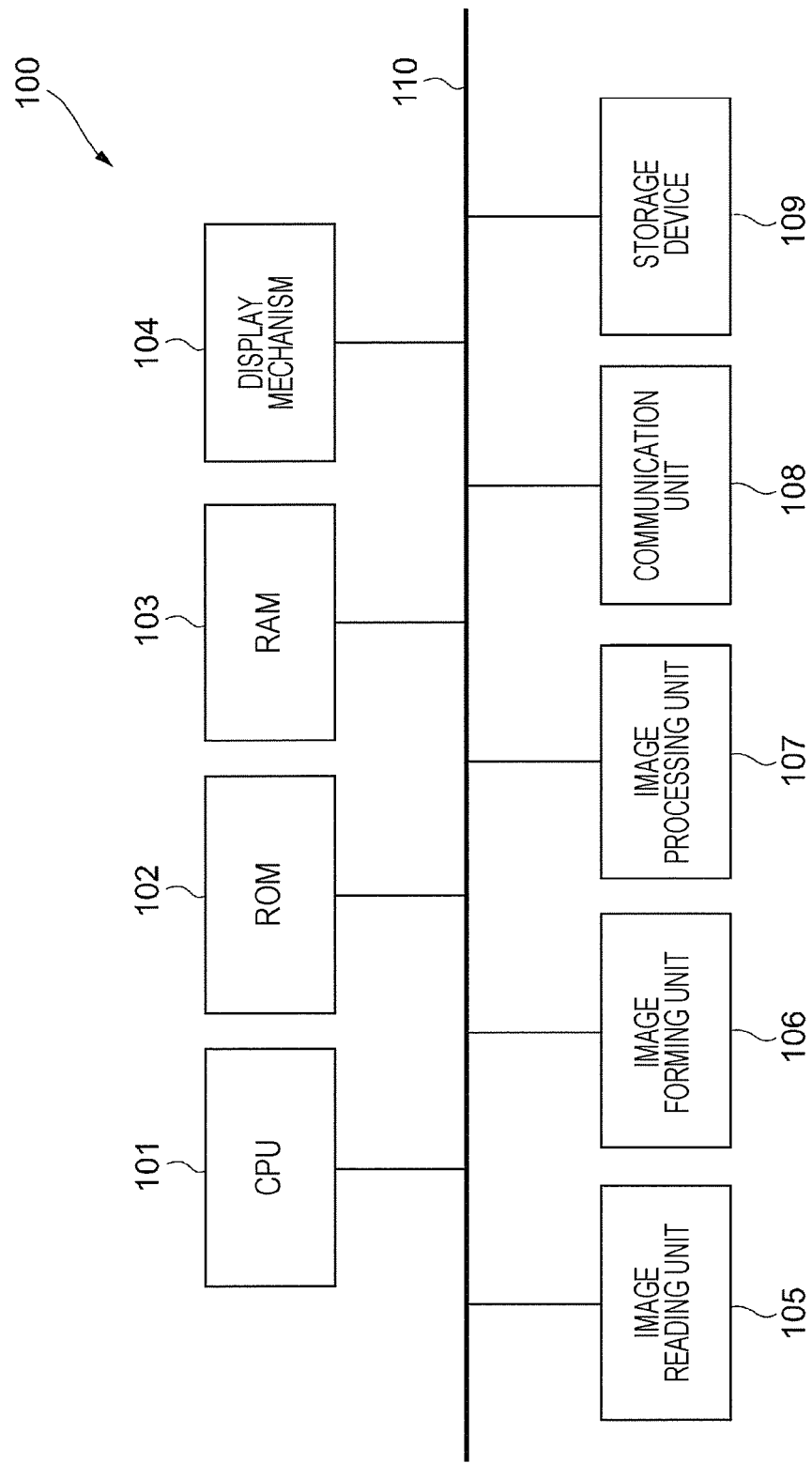
FIG. 1 is a diagram illustrating an example of the hardware configuration of an image processing apparatus according to an exemplary embodiment.

FIG. 1 is a diagram illustrating an example of the hardware configuration of the image processing apparatus 100 according to the present exemplary embodiment.

As illustrated in FIG. 1, the image processing apparatus 100 according to the present exemplary embodiment includes a central processing unit (CPU) 101, a read-only memory (ROM) 102, a random-access memory (RAM) 103, a display mechanism 104, an image reading unit 105, an image forming unit 106, an image processing unit 107, a communication unit 108, and a storage device 109. These functional units are connected to one another by a bus 110 and communicate data with one another through the bus 110.

The CPU 101 executes various programs. The ROM 102 stores control programs to be executed by the CPU 101. The CPU 101 reads one of the control programs stored in the ROM 102 and executes the control program using the RAM 103 as a working area. As a result of the execution of the control program by the CPU 101, a corresponding function of the image processing apparatus 100 is achieved. For example, a predetermined piece of information is displayed on the display mechanism 104. Alternatively, an image is formed on a sheet of paper or a document set on the image reading unit 105 is read.

The display mechanism 104 displays various pieces of information and receives operations performed by an operator. The display mechanism 104 includes a display panel such as a liquid crystal display, a touch panel that is provided on the display panel and that detects a touch by the operator, and physical keys to be pressed by the operator. For example, the display mechanism 104 displays various screens on the display panel and receives operations performed by the operator through the touch panel and the physical keys.

Any device may be used to detect a touch, such as a device that detects a touch on the basis of pressure caused by the touch or a device that detects a touch on the basis of static electricity of an object in contact therewith.

Although a touch by one of the operator's fingers is assumed as a touch operation in the following description, a touch operation is not limited to this. For example, a touch operation may be performed using a stylus pen carried by the operator, instead.

The image reading unit 105 reads a document and generates image data indicating an image of the read document. The image reading unit 105 is a scanner, for example, and may employ a charge-coupled device (CCD) method, in which light radiated from a light source and reflected from a document is reduced by lenses and received by CCDs, or a contact image sensor (CIS) method, in which light sequentially radiated from light-emitting diodes (LEDs) and reflected from a document is received by CISs.

The image forming unit 106 includes a printing mechanism that forms an image on a recording medium such as a sheet of paper. The image forming unit 106 is a printer, for example, and may employ an electrophotographic method, in which toners applied to photosensitive members are transferred onto a recording medium to form an image, or an inkjet method, in which inks are discharged onto a recording medium to form an image.

The image processing unit 107 performs image processing such as color correction and tone correction on input image data, generates image data subjected to the image processing, and outputs the image data to the image forming unit 106 or the like.

The communication unit 108 is connected to a communication line that is not illustrated, and functions as a communication interface that communicates with another apparatus connected to the communication line. If the fax function is performed, for example, the communication unit 108 transmits, to another apparatus, image data regarding a document read by the image reading unit 105.

The storage device 109 includes a storage area such as a hard disk drive and stores, for example, data received by the communication unit 108 and data generated by the image processing apparatus 100.

Functional Configuration of Image Processing Apparatus

Figure 2:
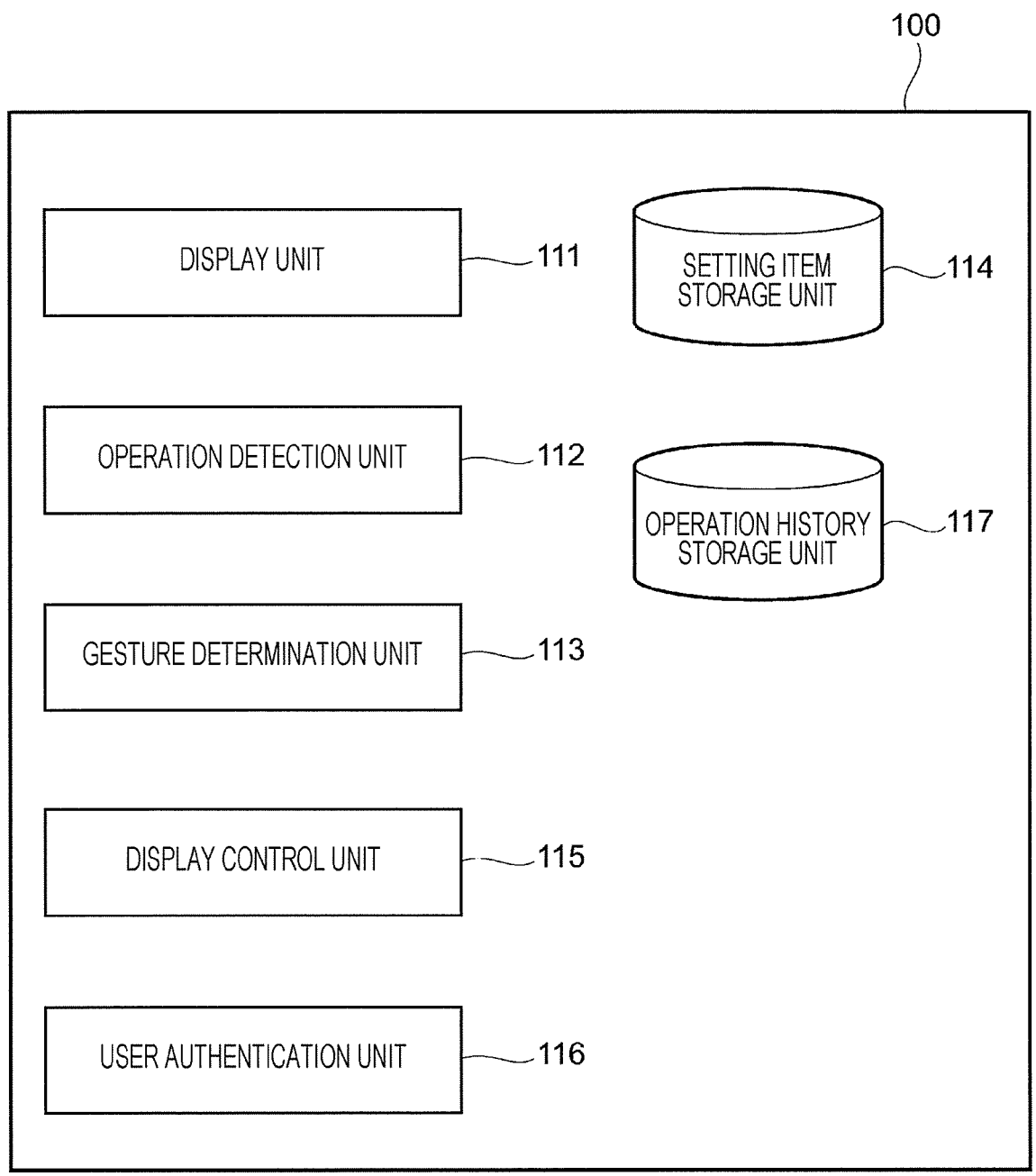
FIG. 2 is a block diagram illustrating an example of the functional configuration of the image processing apparatus according to the exemplary embodiment.

Next, the functional configuration of the image processing apparatus 100 according to the present exemplary embodiment will be described. FIG. 2 is a block diagram illustrating an example of the functional configuration of the image processing apparatus 100 according to the present exemplary embodiment. The image processing apparatus 100 according to the present exemplary embodiment includes a display unit 111, an operation detection unit 112, a gesture determination unit 113, a setting item storage unit 114, a display control unit 115, a user authentication unit 116, and an operation history storage unit 117.

The display unit 111 as an example of a display unit is the display panel of the display mechanism 104 and displays various screens on the basis of control signals output from the display control unit 115.

The display unit 111 displays, for example, a home screen on which various icons indicating the image processing functions (e.g., the copy function and the print function) that can be performed by the image processing apparatus 100 are arranged and a detailed setting screen for making detailed settings for the image processing functions. The detailed setting screen includes a list of a plurality of setting items (hereinafter referred to as a "setting item list") for the image processing functions. Details of the setting item list will be described later.

The operation detection unit 112 detects a touch operation performed by the operator on the display unit 111 and outputs the detected touch operation to the gesture determination unit 113. The operation detection unit 112 assumes an orthogonal coordinate system on the display unit 111 and, if the operator's finger touches the display unit 111, detects coordinates of a point of the touch and outputs the coordinates to the gesture determination unit 113. More specifically, while a touch operation is being performed, the operation detection unit 112 outputs information indicating that a touch operation is being detected, positional information (coordinates) regarding the touch operation on the display unit 111, a time at which the touch operation has been detected, and other pieces of information.

Figure 3:
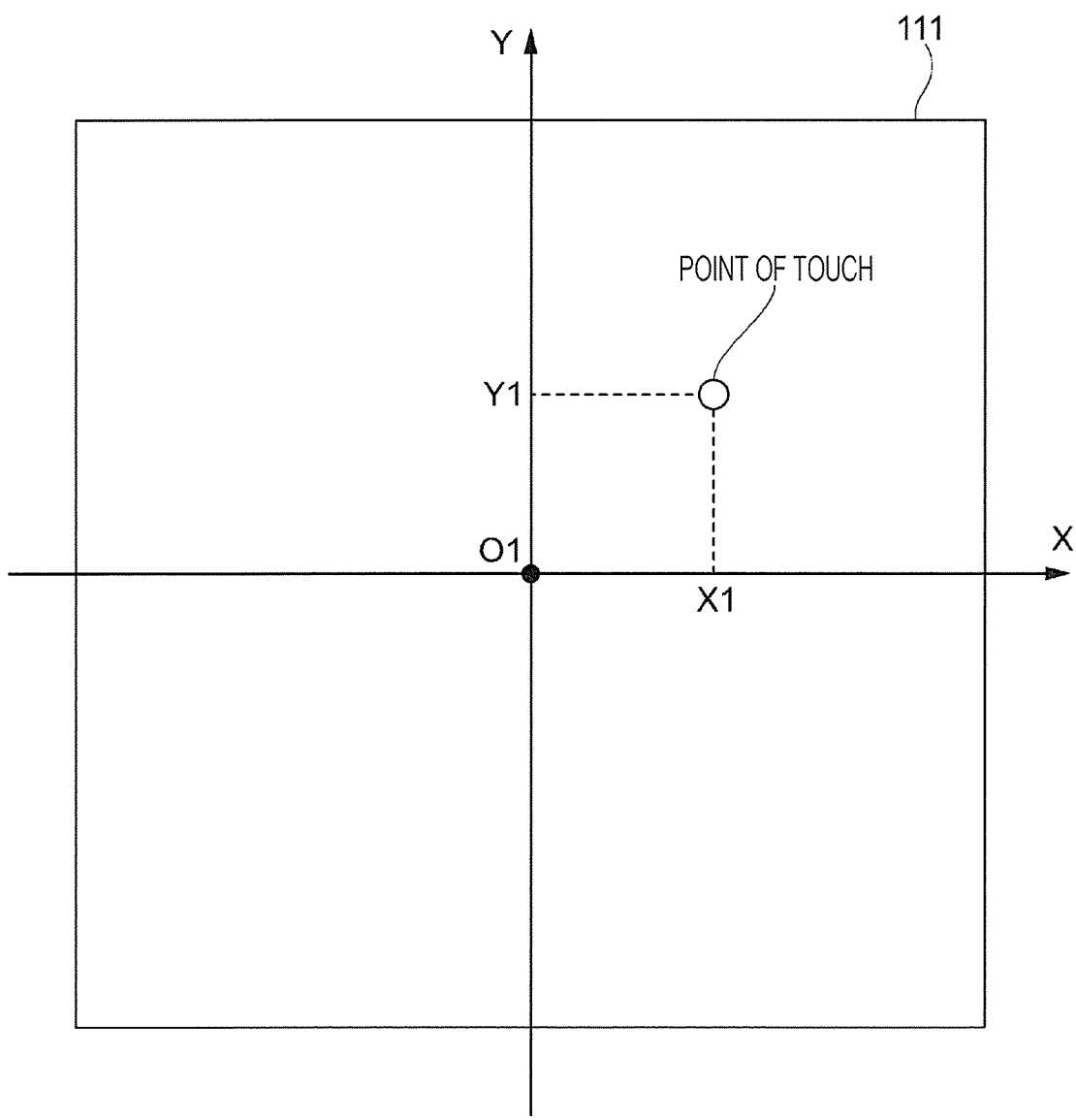
FIG. 3 is a diagram illustrating an example of coordinates set for a display unit.

FIG. 3 is a diagram illustrating an example of a coordinate system set for the display unit ill. In the example illustrated in FIG. 3, an orthogonal coordinate system is set for the display unit 111, and the center of the display unit 111 is determined as an origin O1(0, 0). A width direction of the display unit 111 is determined as an x-axis (positive in a right direction in FIG. 3), and a length direction of the display unit 111 is determined as a y-axis (positive in an upward direction in FIG. 3). For example, a transverse line of a frame of the display unit 111 is determined as an x-axis, and a vertical line of the frame of the display unit 111 is determined as a y-axis. Coordinates are identified on the basis of the number of pixels from the origin O1. If the operator's finger touches the display unit 111, the operation detection unit 112 detects an x-coordinate (x1) and a y-coordinate (y1) of a point of the touch and outputs the x- and y-coordinates to the gesture determination unit 113.

The gesture determination unit 113 determines a type of touch operation (i.e, gesture) detected by the operation detection unit 112 on the basis of information received from the operation detection unit 112.

The gesture determination unit 113 determines a type of touch operation such as a tap, a drag, or a flick. A tap is an operation in which the operator's finger gently hits a screen of the display unit 111. If information indicating a tap is input, the gesture determination unit 113 determines that the operator has selected data at a position of the tap. When a tap operation has been performed on an icon, for example, the gesture determination unit 113 determines that the operator has selected the icon. A drag is an operation in which the operator's finger slides on the screen of the display unit 111.

A flick is an operation in which the operator quickly slides his/her finger on the screen of the display unit 111 and then releases the finger from the screen. As a result of a drag or a flick, for example, the screen scrolls.

The setting item storage unit 114 stores a setting item list for each image processing function.

In the case of the copy function, for example, various setting items are stored as the setting item list, such as an item for setting a color of an output, an item for selecting double-sided printing or single-sided printing, and an item for setting a magnification factor (reduction factor).

Setting information is also stored for each setting item. In the case of the item for setting a color of an output, for example, the setting information includes "color", "monochrome", and "automatic". In the setting information, a piece of information to be used in actual processing is specified as a default (i.e., an initial setting), but the operator may change the specification.

In each setting item list, order in which the setting items are displayed is determined in advance. When the display control unit 115 displays a setting item list, the display control unit 115 arranges setting items in predetermined order.

The display control unit 115 as an example of a display control unit generates a control signal for controlling the display unit 111 and controls the display unit 111.

For example, the display control unit 115 displays a setting item list on the screen. If the operator selects a setting item on the setting item list, the display control unit 115 disposes the selected setting item at a predetermined position on the screen. The predetermined position is, for example, a position in an upper part of the screen. In addition, the display control unit 115 secures a new display area directly below the selected setting item. One of display parts (e.g., a right part) obtained by vertically dividing the display area in two will be referred to as a "first display part", and another of the display parts (e.g., a left part) will be referred to as a "second display part".

The display control unit 115 then displays, in the first display part, a predetermined number of setting items other than that selected by the operator. That is, setting items that have not been selected by the operator are displayed in the first display part. The operator may then select one of the setting items displayed in the first display part.

The display control unit 115 displays, in the second display part, on the other hand, setting information corresponding to the setting item selected by the operator. Although a piece of setting information is automatically specified and displayed as an initial setting, the operator may change the specification.

Next, if the operator selects one of the predetermined number of setting items displayed in the first display part, the display control unit 115 displays the selected setting item at the position of the previously selected setting item (i.e., at the predetermined position on the screen). The predetermined number of setting items other than those selected by the operator are displayed in the first display part. Setting information corresponding to the latest setting item selected by the operator is displayed in the second display part.

The display control unit 115 displays setting items in the first display part in accordance with a predetermined rule. The predetermined rule is, for example, that setting items that have not been selected by the operator are displayed in predetermined order.

Setting items may be displayed in a display area other than the first display part, such as above or below the first display part. The display control unit 115 may display, in the first display part in accordance with the predetermined rule, setting items that have not been selected by the operator and that are not displayed in display areas other than the first display part.

The user authentication unit 116 authenticates the operator of the image processing apparatus 100. If the operator inputs, to the display unit 111, information necessary for authentication (e.g., an operator identifier (ID) and a password), for example, the user authentication unit 116 determines whether the input information matches information registered in advance. If so, the user authentication unit 116 authenticates the operator, and the operator logs in. Operations performed on the image processing apparatus 100 thereafter are stored as operations performed by the operator.

In the present exemplary embodiment, an authentication method is not limited. For example, the operator may be identified and authenticated with an integrated circuit (IC) card such as a staff identity card held onto an IC card reader (not illustrated) of the image processing apparatus 100, instead.

The operation history storage unit 117 stores an operation history for each operator. The operation history storage unit 117 stores operations (e.g., operations performed on the display unit 111) performed after the operator logs in as operations performed by the operator.

The functional units of the image processing apparatus 100 are achieved as a result of coordinated operation of software and hardware. More specifically, when the image processing apparatus 100 is achieved by the hardware configuration illustrated in FIG. 1, for example, various programs stored in the ROM 102, the storage device 109, and the like are loaded into the RAM 103 and executed by the CPU 101, and the operation detection unit 112, the gesture determination unit 113, the display control unit 115, and the user authentication unit 116 illustrated in FIG. 2 are achieved. The display unit 111 is achieved, for example, by the display mechanism 104. The setting item storage unit 114 and the operation history storage unit 117 are achieved, for example, by the storage device 109.

Display Process

Next, a display process performed by the display control unit 115 will be described.

In the following description, a term "step" used in processes will be abbreviated as an "S".

Figure 4:
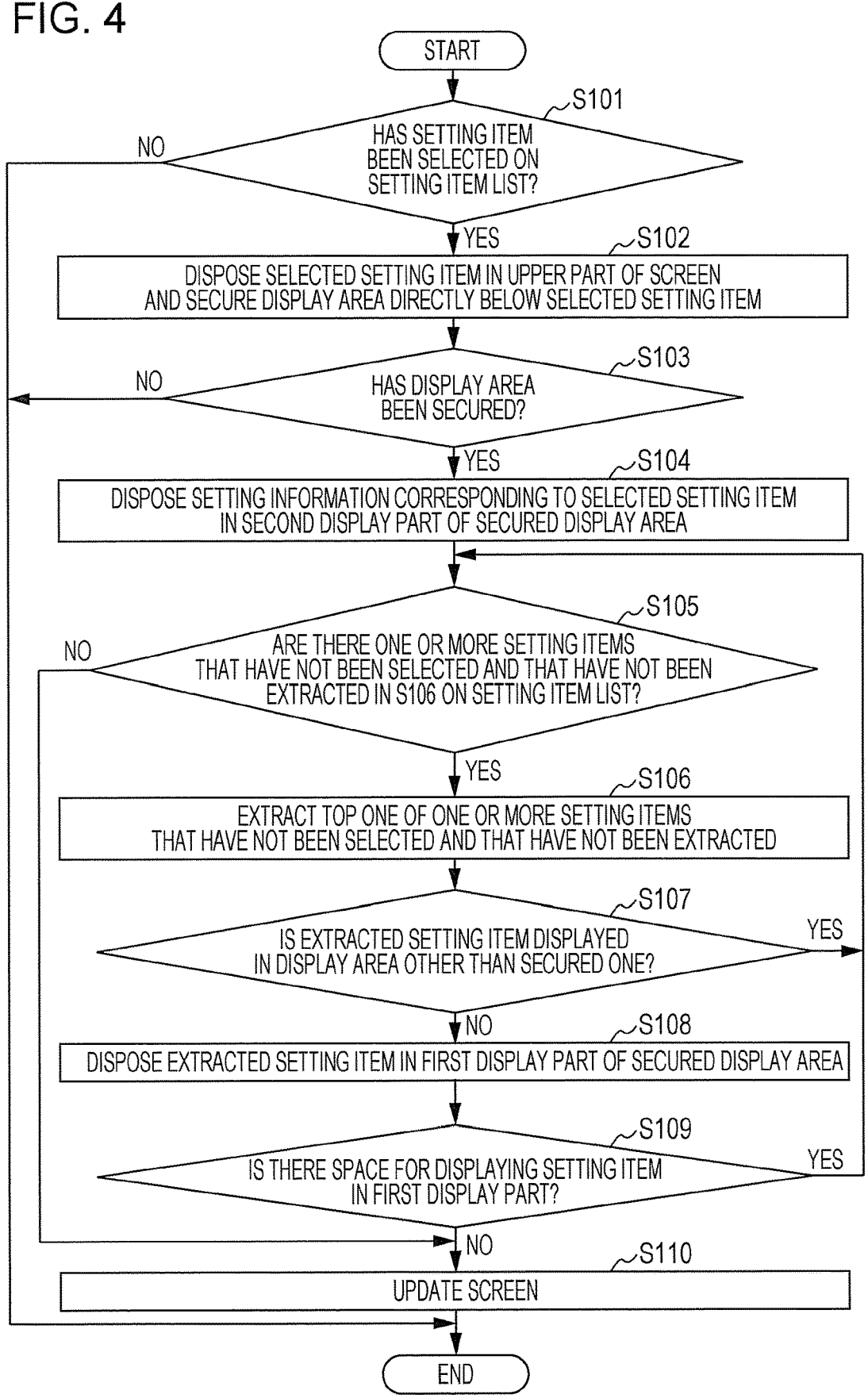
FIG. 4 is a flowchart illustrating an example of a process at a time when a setting item has been selected for a first time on a setting item list.

FIG. 4 is a flowchart illustrating an example of a process at a time when a setting item has been selected for a first time on a setting item list. It is assumed, for example, that a setting item list for the copy function is displayed on the screen. For example, the process illustrated in FIG. 4 is performed regularly (e.g., at intervals of 10 milliseconds). It is also assumed that the display control unit 115 displays setting items in the first display part in predetermined order.

First, the display control unit 115 determines whether a setting item has been selected on a setting item list displayed on the screen (S101). For example, the operation detection unit 112 detects a touch operation performed by the operator, and the gesture determination unit 113 determines the type of touch operation. If a tap operation is performed on any of setting items on the setting item list displayed on the screen, the display control unit 115 determines that a setting item has been selected.

The setting item list includes not only the setting items displayed on the screen but also setting items that are not displayed on the screen. The setting items that are not displayed on the screen are displayed on the screen if the operator scrolls the screen.

If a result of S101 is negative (NO), the process ends.

If the result of S101 is positive (YES), the display control unit 115 disposes the selected setting item at an upper part of the screen and secures a display area directly below the selected setting item (S102). Next, the display control unit 115 determines whether a display area has been secured in S102 (S103).

If a result of S103 is negative (NO), the process ends. The result of S103 becomes negative (NO) when, for example, there is not enough space for displaying new information. In this case, a display area is not secured, and the screen is displayed in a process different from a process based on S104 to S110.

If the result of S103 is positive (YES), on the other hand, the display control unit 115 disposes setting information corresponding to the setting item selected in S101 in a second display part, which is one of display parts obtained by vertically dividing the display area secured in S102 in two (S104).

Next, the display control unit 115 determines whether there are one or more setting items that have not been selected by the operator and that have not been extracted in S106, which will be described later, on the setting item list (S105). Here, whether there are one or more setting items that have not been selected by the operator and that have not been extracted on the setting item list is determined not only among the setting items displayed on the screen but also among the setting items that are not displayed on the screen.

If a result of S105 is negative (NO), the process proceeds to S110, which will be described later.

If the result of S105 is positive (YES), on the other hand, the display control unit 115 extracts a top one of the one or more setting items that have not been selected by the operator and that have not been extracted (S106). In this example, a "top setting item" refers to a setting item displayed at a top in the predetermined order.

Next, the display control unit 115 determines whether the setting item extracted in S106 is displayed on the screen in a display area other than that secured in S102 (S107). If a result of S107 is positive (YES), the process proceeds to S105. If the result of S107 is negative (NO), the display control unit 115 displays the setting item extracted in S106 in a first display part, which is another of the display parts obtained by vertically dividing the display area secured in S102 in two (S108).

Next, the display control unit 115 determines whether there is space for displaying the setting item in the first display part (S109). Here, if the predetermined number of setting items have not been displayed in the first display part, a result of S109 becomes positive (YES). If the predetermined number of setting items have been displayed, on the other hand, the result of S109 becomes negative (NO).

If the result of S109 is positive (YES), the process proceeds to S105.

If the result of S109 is negative (NO), on the other hand, the display control unit 115 updates the screen (S110). As a result of the update of the screen, the setting information corresponding to the setting item selected by the operator is displayed in the second display part. Setting items are arranged in the first display part as a list. In a display area other than the first and second display parts, setting items that are not displayed in the first display part and the like are displayed. The process then ends.

Figure 5:
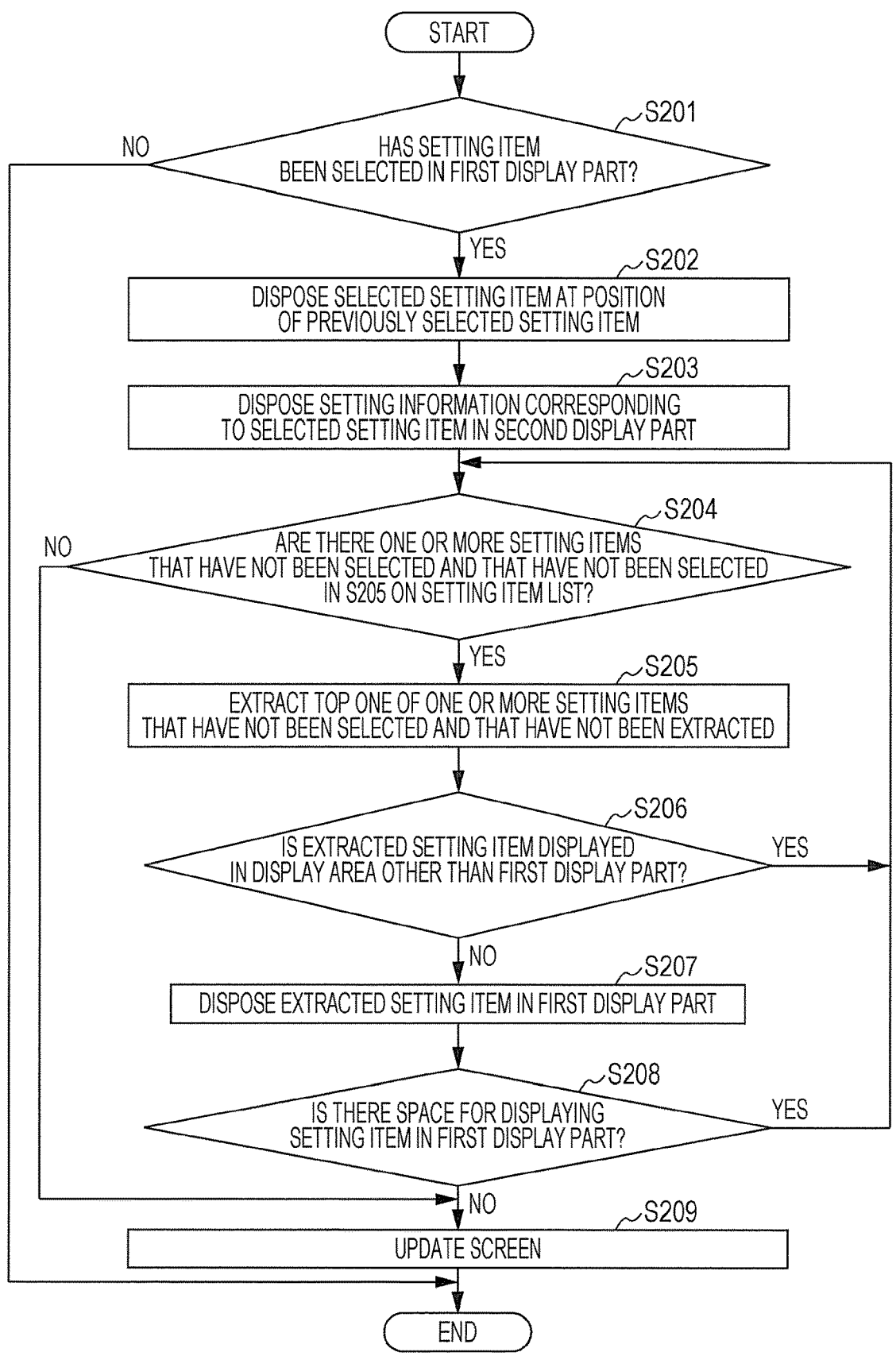
FIG. 5 is a flowchart illustrating an example of a process at a time when, after a setting item is selected for the first time on a setting item list, another setting item has been selected in a first display part.

FIG. 5 is a flowchart illustrating an example of a process at a time when, after a setting item is selected for the first time on a setting item list, another setting item has been selected in a first display part. For example, the process illustrated in FIG. 5 is performed regularly (e.g., at intervals of 10 milliseconds).

First, the display control unit 115 determines whether a setting item has been selected in the first display part (S201). The determination is made in the same manner as in S101 illustrated in FIG. 4.

If a result of S201 is negative (NO), the process ends.

If the result of S201 is positive (YES), the display control unit 115 newly disposes the setting item selected in S201 at a position of a previously selected setting item (S202). More specifically, the display control unit 115 disposes the setting item selected in S201 directly above the first and second display parts.

Next, the display control unit 115 disposes setting information corresponding to the setting item selected in S201 in the second display part (S203). Next, the display control unit 115 determines whether there are one or more setting items that have not been selected by the operator and that have not been extracted in S205, which will be described later, on the setting item list (S204). Here, as in S105 illustrated in FIG. 4, whether there are one or more setting items that have not been selected by the operator and that have not been extracted on the setting item list is determined not only among setting items that are displayed on the screen but also among setting items that are not displayed on the screen.

If a result of S204 is negative (NO), the process proceeds to S209, which will be described later.

If the result of S204 is positive (YES), on the other hand, the display control unit 115 extracts a top one of the one or more setting items that have not been selected by the operator and that have not been extracted (S205). In this example, a "top setting item" refers to a setting item displayed at a top in the predetermined order.

Next, the display control unit 115 determines whether the setting item extracted in S205 is displayed on the screen in a display area other than the first display part (S206). If a result of S206 is positive (YES), the process proceeds to S204. If the result of S206 is negative (NO), the display control unit 115 disposes the setting item extracted in S205 in the first display part (S207).

Next, the display control unit 115 determines whether there is space for displaying the setting item in the first display part (S208). The determination is made in the same manner as in S109 illustrated in FIG. 4.

If a result of S208 is positive (YES), the process proceeds to S204.

If the result of S208 is negative (NO), on the other hand, the display control unit 115 updates the screen (S209). As a result of the update of the screen, the setting information corresponding to the setting item selected by the operator is displayed in the second display part. Setting items are arranged in the first display part as a list. Setting items that are not displayed in the first display part and the like are displayed in a display area other than the first and second display parts. The process then ends.

Another Example of Predetermined Rule

Next, another example of the predetermined rule when setting items are displayed in the first display part will be described.

In the example illustrated in FIGS. 4 and 5, the predetermined rule is that setting items are displayed in predetermined order. The present exemplary embodiment is not limited to a configuration in which setting items are displayed in accordance with such a rule.

Display Based on Relevance to Selected Setting Item

The display control unit 115 may display setting items in the first display part on the basis of relevance to a setting item selected by the operator, instead. For example, the predetermined rule may be that setting items relevant to a setting item selected by the operator take priority in display.

For example, levels of relevance with other setting items are predetermined for each setting item on a setting item list. FIG. 6 is a diagram illustrating an example of information indicating levels of relevance between each setting item and other setting items.

FIG. 6 illustrates an example of the setting item list for the copy function. Relevant setting items are set for each setting item.

"Color Mode", for example, is an item for setting a color of an output. A setting item most highly relevant to "Color Mode" is priority level 1 "Reduce/Enlarge". A second most highly relevant setting item is priority level 2 "Paper Supply", and a third most highly relevant setting item is priority level 3 "Preview". Similarly, for "2 Sided Copying", for example, "N-up", "Color Mode", "Preview", "Reduce/Enlarge", and "Paper Supply" are set as relevant setting items in descending order of relevance.

If the operator selects "Color Mode" first on the setting item list displayed on the screen, for example, "Reduce/Enlarge", "Paper Supply", and "Preview" are displayed in the first display part from the top in this order.

If "Reduce/Enlarge", "Paper Supply", or "Preview" is to be displayed in a display area other than the first display part among, the setting item need not be displayed in the first display part.

If there is still space for displaying other setting items in the first display part even after "Reduce/Enlarge", "Paper Supply", and "Preview" are displayed, other setting items on the setting item list are displayed in the first display part.

Relevant setting items are not set for some setting items such as "Preview" illustrated in FIG. 6. If such a setting item is selected, other setting items are displayed in the first display part in the predetermined order.

The information indicating levels of relevance between each setting item and other setting items may be any type of information insofar as levels of relevance between the setting items are indicated, and is not limited to that illustrated in FIG. 6. For example, levels of relevance between each setting item and other setting items may be indicated with values.

Display Based on Operation History of Operator

The display control unit 115 may display setting items in the first display part on the basis of an operation history of the operator. That is, the predetermined rule may be based on the operation history of the operator.

For example, the display control unit 115 displays, in the first display part, setting items that have been frequently selected by the operator in the past.

More specifically, the display control unit 115 obtains, from the operation history storage unit 117, an operation history of an operator who has logged in. The display control unit 115 then identifies, from the obtained operation history, the number of times of selection by the operator for each setting item on a setting item list. If the operator selects one of the setting items on the setting item list displayed on the screen, the display control unit 115 displays the other setting items in the first display part in order of descending frequency of selection by the operator.

If there is any setting item to be displayed in a display area other than the first display part, the setting item need not be displayed in the first display part.

If the operator selects one of the setting items, for example, the display control unit 115 may display, in the first display part, other setting items that have been frequently selected by the operator in the past as a next setting item, instead.

More specifically, the display control unit 115 obtains, from the operation history storage unit 117, an operation history of an operator who has logged in. The display control unit 115 then identifies, from the obtained operation history, the number of times of selection by the operator as a next setting item for each of the setting items on the setting item list when each of the other setting items has been selected. If the operator selects one of the setting items on the setting item list displayed on the screen, the display control unit 115 displays the other setting items in the first display part in order of descending frequency of selection by the operator as a next setting item.

If there is any setting item to be displayed in a display area other than the first display part, the setting item need not be displayed in the first display part.

Setting items are thus displayed in the first display part on the basis of relevance to a setting item selected by the operator or the operation history of the operator.

Alternatively, the display control unit 115 may randomly extract setting items from setting items to be displayed and display the extracted setting items in the first display part.

Specific Example of Display Process

Next, a specific example of the display process performed by the display control unit 115 will be described. FIGS. 7A to 9B are diagrams illustrating the specific example of the display process performed by the display control unit 115. Here, setting items for the copy function are displayed as an example of setting items displayed on the screen.

Figure 7A:
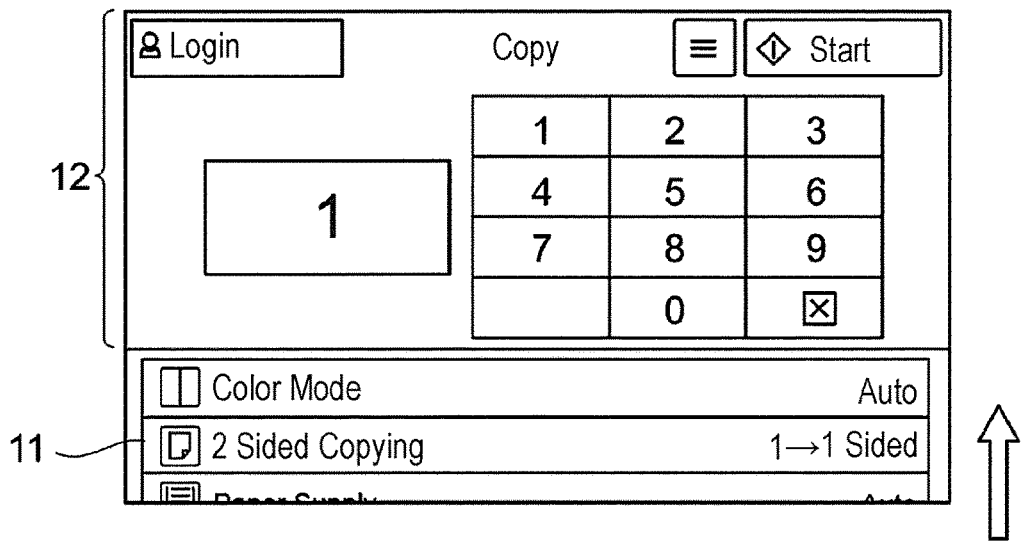
FIGS. 7A to 7C are diagrams illustrating a specific example of a display process performed by a display control unit.

FIG. 7A illustrates a screen on which an image 11 of a setting item list is displayed. Information that is not the setting item list is displayed in an area 12. Although only three setting items are displayed in the example illustrated in FIG. 7A, the image 11 moves in a direction of an arrow if the operator touches the image 11 and scrolls the image 11 in the direction of the arrow. As a result, setting items are also displayed in the area 12, and, as illustrated in FIG. 7B, other setting items are also displayed.

Figure 7B:
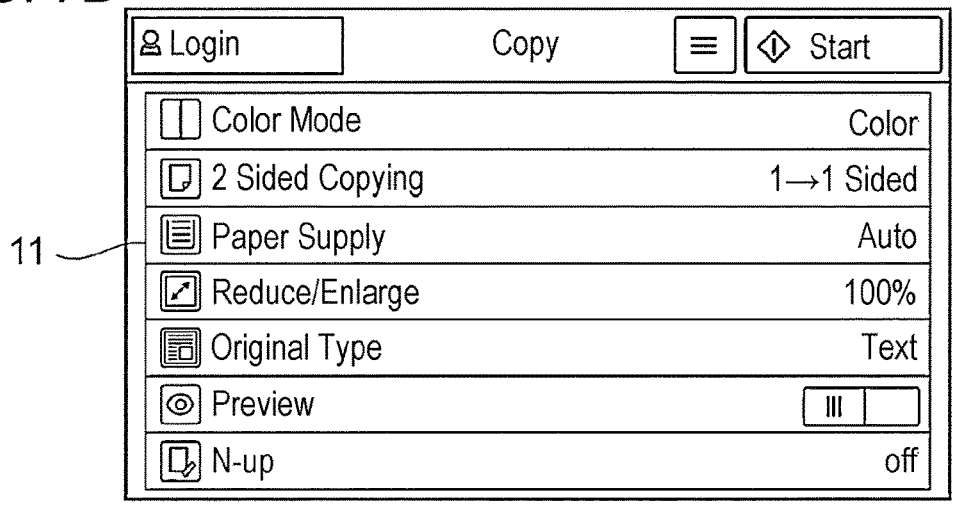
Figure 7C:
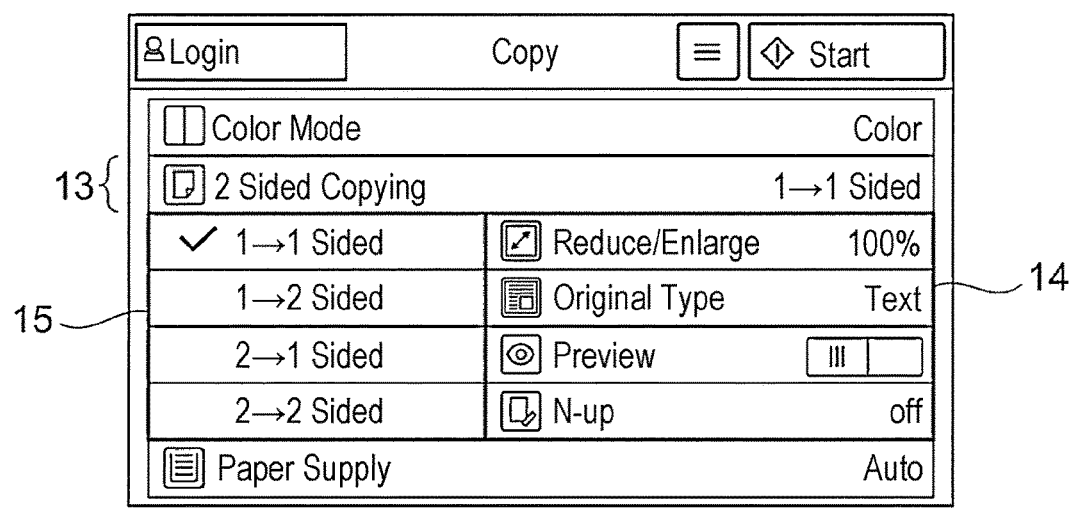

Next, if the operator selects "2 Sided Copying" in the image 11 illustrated in FIG. 7A or 7B, a screen illustrated in FIG. 7C is displayed.

The display control unit 115 disposes "2 Sided Copying" at a position 13, which is a predetermined position on the screen. The display control unit 115 also secures a display area directly below "2 Sided Copying". Here, a left one of display parts obtained by vertically dividing the secured display area in two is a second display part 15. A right one of the display parts obtained by vertically dividing the secured display area in two is a first display part 14.

The display control unit 115 then disposes setting information corresponding to "2 Sided Copying" in the second display part 15. In the example illustrated in FIG. 7C, four items, "1→1 Sided", "1→2 Sided", "2→1 Sided", and "2→2 Sided", are disposed as the setting information. Although "1→1 Sided" is specified as a default, the operator may specify another item.

The display control unit 115 also disposes setting items in the first display part 14. The display control unit 115 disposes, in accordance with a predetermined rule, setting items other than that selected by the operator and ones displayed in display areas other than the first display part 14. In the example illustrated in FIG. 7C, "2 Sided Copying" has been selected. "Color Mode", "2 Sided Copying", and "Paper Supply" are displayed in the display areas other than the first display part 14. The display control unit 115 therefore disposes setting items other than the three setting items in accordance with the predetermined rule.

In this example, the display control unit 115 disposes the setting items in predetermined order of display. As a result, "Reduce/Enlarge", "Original Type", "Preview", and "N-up" are displayed in the first display part 14 in this order from a top.

As described above, setting items may be displayed on the basis of relevance to "2 Sided Copying" or the operation history of the operator, instead.

More specifically, the three setting items, "Color Mode", "2 Sided Copying", and "Paper Supply", are displayed on the screen illustrated in FIG. 7A before the operator selects "2 Sided Copying". A total of seven setting items are displayed on the screen illustrated in FIG. 7B. If the operator selects "2 Sided Copying", on the other hand, the four setting items are displayed in the first display part 14 and the three setting items are displayed in the display areas other than the first display part 14 as illustrated in FIG. 7C. That is, four more setting items are displayed on the screen illustrated in FIG. 7C than on the screen illustrated in FIG. 7A. The number of setting items displayed is the same between the screen illustrated in FIG. 7B and the screen illustrated in FIG. 7C.

In the present exemplary embodiment, therefore, it may be regarded that, when the operator has selected a setting item, the display control unit 115 displays setting information corresponding to the setting item and other setting items such that the number of setting items displayed remains the same before and after the operator selects the setting item.

Figure 8A:
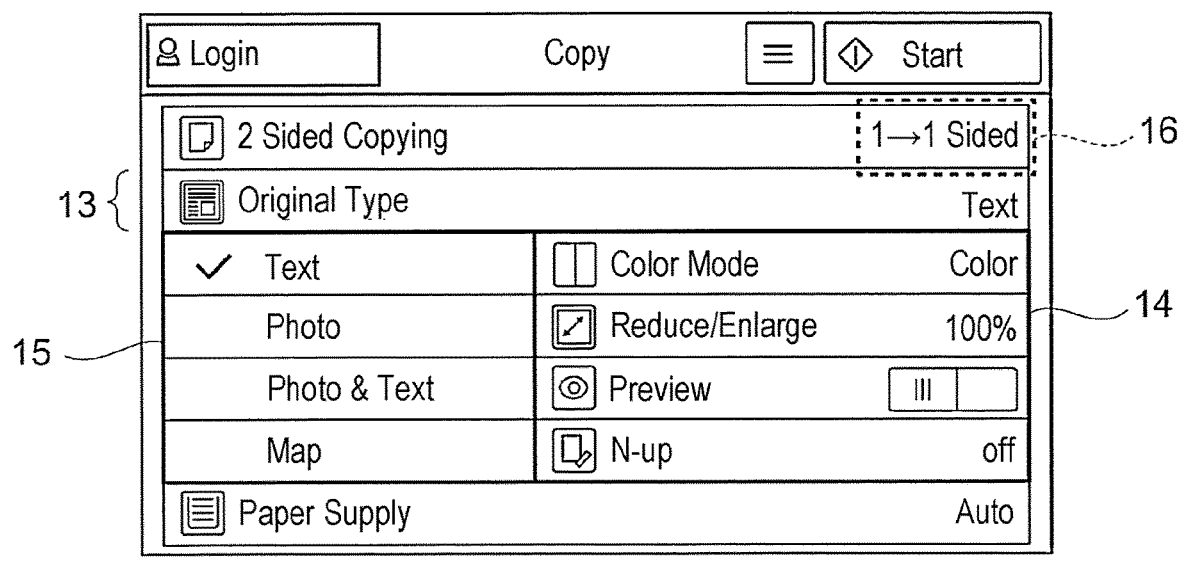
FIGS. 8A and 8B are diagrams illustrating the specific example of the display process performed by the display control unit.

Next, if the operator selects "Original Type" in the first display part 14 illustrated in FIG. 7C, a screen illustrated in FIG. 8A is displayed.

The display control unit 115 disposes "Original Type" at the position 13, which is the predetermined position on the screen. The display control unit 115 then disposes "2 Sided Copying", which has been disposed at the position 13 before "Original Type", above "Original Type". It is indicated in an area 16 that "1→1 Sided" has been specified as setting information for "2 Sided Copying".

The display control unit 115 also disposes setting information corresponding to "Original Type" in the second display part 15. In the example illustrated in FIG. 8A, four pieces of setting information, "Text", "Photo", "Photo & Text", and "Map", are disposed. Although "Text" is specified as a default, the operator may specify another piece of setting information.

The display control unit 115 also disposes setting items in the first display part 14. The display control unit 115 disposes, in accordance with a predetermined rule, the setting items other than those selected by the operator and those displayed in the display areas other than the first display part 14. In the example illustrated in FIG. 8A, "2 Sided Copying" and "Original Type" have been selected. "2 Sided Copying", "Original Type", and "Paper Supply" are displayed in the display areas other than the first display part 14. The display control unit 115 therefore disposes the setting items other than the three setting items in accordance with the predetermined rule.

The display control unit 115 disposes, as in FIG. 7C, the setting items in predetermined order of display. As a result, "Color Mode", "Reduce/Enlarge", "Preview", and "N-up" are displayed in the first display part 14 in this order from the top.

In other words, in the first display part 14 illustrated in FIG. 8A, "Color Mode", which has not been displayed in the first display part 14 illustrated in FIG. 7C, is newly displayed.

Figure 8B:
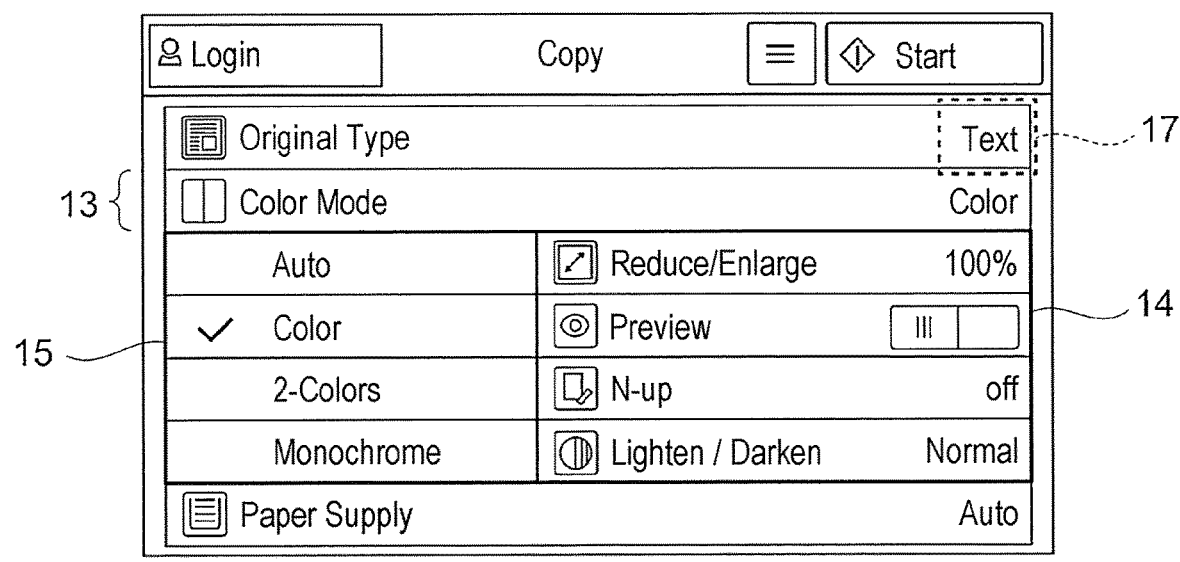

Next, if the operator selects "Color Mode" in the first display part 14 illustrated in FIG. 8A, a screen illustrated in FIG. 8B is displayed.

The display control unit 115 disposes "Color Mode" at the position 13, which is the predetermined position on the screen. The display control unit 115 disposes "Original Type", which has been disposed at the position 13 before "Color Mode", above "Color Mode". It is indicated in an area 17 that "Text" has been specified as setting information for "Original Type".

The display control unit 115 also disposes setting information corresponding to "Color Mode" in the second display part 15. In the example illustrated in FIG. 8B, four pieces of setting information, "Auto", "Color", "2-Colors", and "Monochrome", are displayed. Although "Auto" is a default piece of setting information, "Color" is specified in FIG. 8B since the operator has selected "Color".

The display control unit 115 also disposes setting items in the first display part 14. The display control unit 115 disposes, in accordance with a predetermined rule, the setting items other than those selected by the operator and those displayed in the display areas other than the first display part 14. In the example illustrated in FIG. 8B, "2 Sided Copying", "Original Type", and "Color Mode" have been selected. "Original Type", "Color Mode", and "Paper Supply" are displayed in the display areas other than the first display part 14. The display control unit 115 therefore disposes the setting items other than "2 Sided Copying", "Original Type", "Color Mode", and "Paper Supply" in accordance with the predetermined rule.

The display control unit 115 disposes, as in FIG. 7C, the setting items in predetermined order of display. As a result, "Reduce/Enlarge", "Preview", "N-up", and "Lighten/Darken" are displayed in the first display part 14 in this order from the top.

In other words, in the example illustrated in FIG. 8B, "Lighten/Darken", which has not been displayed on the screen, is newly displayed.

The first display part 14 and the second display part 15 are thus newly provided if the operator selects a setting item in the image 11 of a setting item list. Setting items are then displayed in the first display part 14, and setting information corresponding to the setting item selected by the operator is displayed in the second display part 15.

The operator can then select another setting item displayed in the first display part 14. Setting information to be displayed in the second display part 15 changes in accordance with the setting item selected by the operator, and setting items to be displayed in the first display part 14 also change. As illustrated in FIG. 8B, for example, a setting item that has not been displayed before the operator selects the setting item is newly displayed in the first display part 14, and the operator can select the setting item without scrolling the screen. In addition, since setting information corresponding to a setting item selected by the operator does not pop up in this example, the operator need not close a popup.

In addition, setting items selected by the operator, such as "2 Sided Copying" illustrated in FIG. 8A and "Original Type" illustrated in FIG. 8B, are sequentially disposed on a setting item list from the top.

Figure 9A:
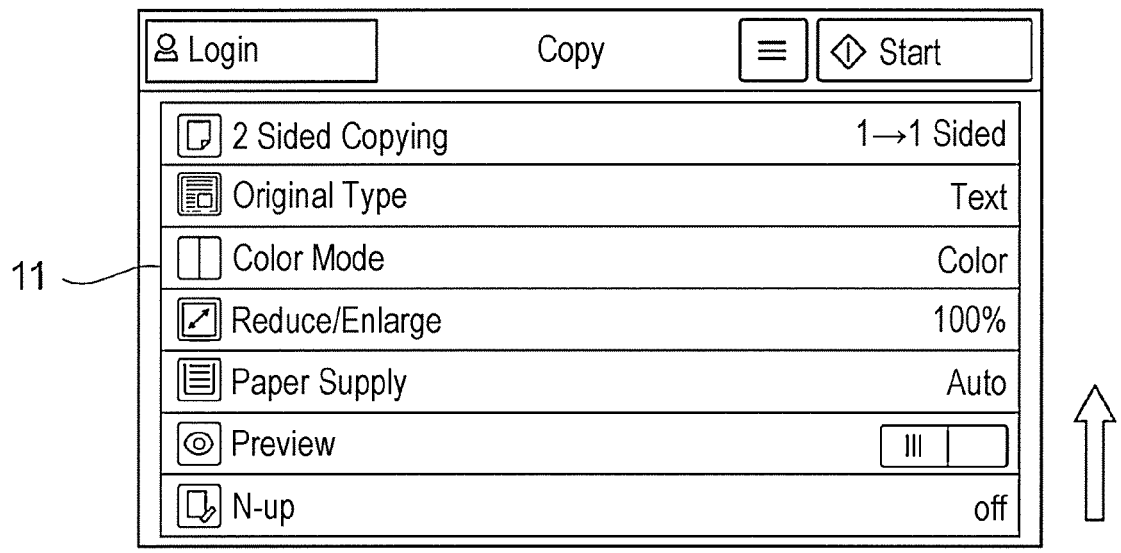
FIGS. 9A and 9B are diagrams illustrating the specific example of the display process performed by the display control unit.

FIG. 9A is a diagram illustrating an example of setting items selected by the operator. In the example illustrated in FIG. 9A, the operator has selected "2 Sided Copying", "Original Type", "Color Mode", "Reduce/Enlarge", "Paper Supply", "Preview", and "N-up" in this order. In other words, order of the setting items is different from the first order illustrated in FIG. 7B, that is, the setting items are arranged in order of selection by the operator. Setting information employed by the operator (i.e., default setting information or setting information selected by the operator) is also displayed for each of the setting items selected by the operator.

Figure 9B:
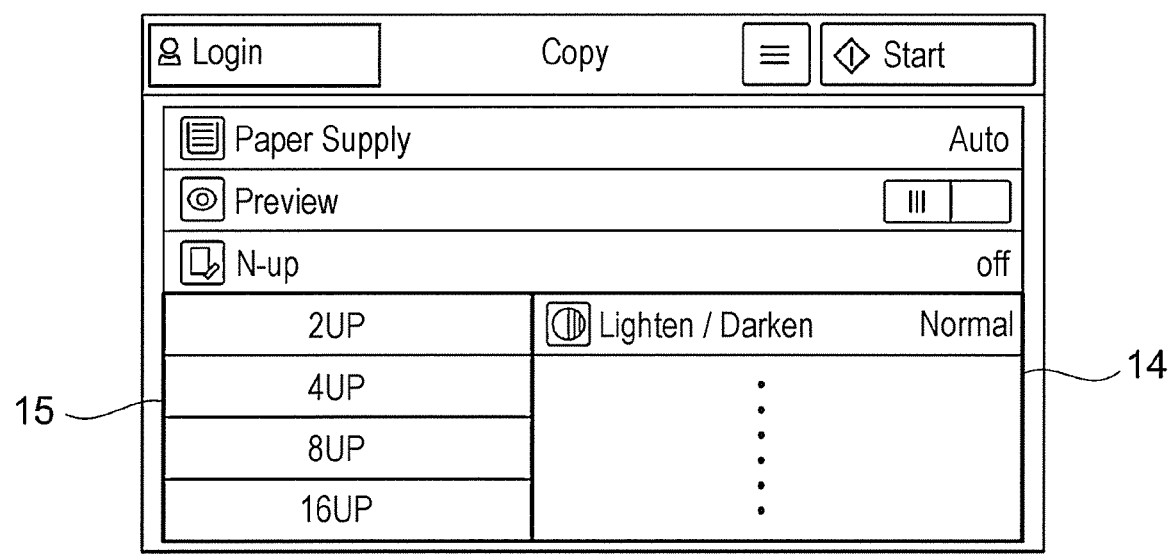

In the example illustrated in FIG. 9A, the operator has just selected "N-up", and a screen illustrated in FIG. 9B is displayed if the operator scrolls the screen in a direction of an arrow. Setting information corresponding to "N-up" is displayed on the screen illustrated in FIG. 9B in the second display part 15. Setting items that have not been selected by the operator on the setting item list are displayed in the first display part 14.

In the present exemplary embodiment, if the operator selects a setting item on a setting item list for the first time, a first display part and a second display part are newly provided as described above. Setting items other than that selected by the operator are displayed in the first display part, and setting information corresponding to the setting item selected by the operator is displayed in the second display part. Next, if the operator selects another setting item in the first display part, setting items other than those selected by the operator are displayed in the first display part, and setting information corresponding to the latest setting item selected by the operator is displayed. With this configuration, setting items to be displayed on the screen are updated as a result of an operation for selecting a setting item performed by the operator.

Although the first and second display parts are provided directly below a position at which a setting item selected by the operator is displayed in the above example, the first and second display parts may be provided at another position, instead. For example, the first and second display parts may be provided directly above a position at which a setting item selected by the operator is displayed. In addition, another piece of information may be displayed between a position at which a setting item selected by the operator is displayed and the first and second display parts.

Although a newly secured display area is vertically divided in two and left and right display parts are determined as second and first display parts, respectively, in the above example, the first and second display parts are not limited to these. For example, the left and right display parts may be determined as the first and second display parts, respectively, instead. In addition, a newly secured display area need not be vertically divided in two. For example, a newly secured display area may be horizontally divided in two, and one of display parts may be determined as the first display part, and another may be displayed as the second display part.

Although four setting items are displayed in the first display part in the above example, the number of setting items displayed is not limited to four. Less than four or more than five setting items may be displayed, instead.

In addition, the number of setting items displayed in the first display part may be changed in accordance with a setting item selected by the operator. If there are a large number of setting items relevant to a setting item selected by the operator, for example, five or more setting items may be displayed. The size of the first display part may be increased or the size of letters used for setting items may be reduced in accordance with the number of setting items to be displayed in the first display part.

Similarly, although four pieces of setting information are displayed in the second display part in the above example, the number of pieces of setting information displayed is not limited to four. Less than four or more than five pieces of setting information may be displayed, instead.

Furthermore, the number of pieces of setting information to be displayed in the second display part may be changed in accordance with a setting item selected by the operator. For example, if four pieces of setting information correspond to a setting item selected by the operator, the four pieces of setting information may be displayed in the second display part. If five pieces of setting information correspond to a setting item selected by the operator, the five pieces of setting information may be displayed in the second display part. The size of the second display part may be increased or the size of letters used for setting information may be reduced in accordance with the number of pieces of setting information to be displayed in the second display part.

The number of setting items to be displayed in the first display part and the number of pieces of setting information to be displayed in the second display part may be the same or different from each other. When the number of setting items to be displayed in the first display part and the number of pieces of setting information to be displayed in the second display part are different from each other, the first and second display parts may be the same or different from each other in size.

In the present exemplary embodiment, the number of setting items to be displayed in the first display part need not be fixed to a predetermined number. Setting items to be displayed in the first display part may be updated when the operator has selected a setting item. More specifically, in the present exemplary embodiment, the display control unit 115 may be regarded as newly displaying, when the operator has selected one of a plurality of setting items displayed in the first display part, setting items other than the plurality of setting items in the first display part without displaying the setting item selected by the operator and also displaying, in the second display part, setting information corresponding to the setting item selected by the operator. As described in the examples illustrated in FIGS. 7A to 9B, the plurality of setting items displayed before the setting item is selected may be displayed again in the first display part, except for that selected by the operator.

Although the image processing apparatus 100 includes a touch panel and the operator touches a screen to perform an operation in the above example, the configuration of the image processing apparatus 100 is not limited to this. For example, the image processing apparatus 100 may include a pointing device such as a mouse, and the operation detection unit 112 may receive operations performed by the operator using the pointing device, instead. Alternatively, for example, the image processing apparatus 100 may include an input unit such as input buttons, and the operation detection unit 112 may receive operations performed by the operator using the input buttons.

In the above example, setting items for an image processing function are displayed, the operator selects one of the setting items, and the screen is controlled in accordance with the selection. Setting items in the present exemplary embodiment are not limited to those for the image processing functions, and any kind of setting items may be used insofar as one of the setting items can be selected by the operator. A list of jobs that are being executed by the image processing apparatus 100 or waiting for execution or a list of addresses to which data is to be transmitted from the image processing apparatus 100, for example, may be displayed, the operator may select one of the jobs or the addresses, and the screen may be controlled in accordance with the selection, instead.

Another Example of Hardware Configuration

Although a configuration including the image processing apparatus 100 has been described in the above example, the present exemplary embodiment may be applied to another device including a display mechanism, such as a personal computer (PC) or a mobile information terminal (i.e., a smartphone, a tablet terminal, etc.), instead. In the following description, a computer 200 such as a PC or a mobile information terminal is used instead of the image processing apparatus 100. The hardware configuration of the computer 200 will be described.

Figure 10:
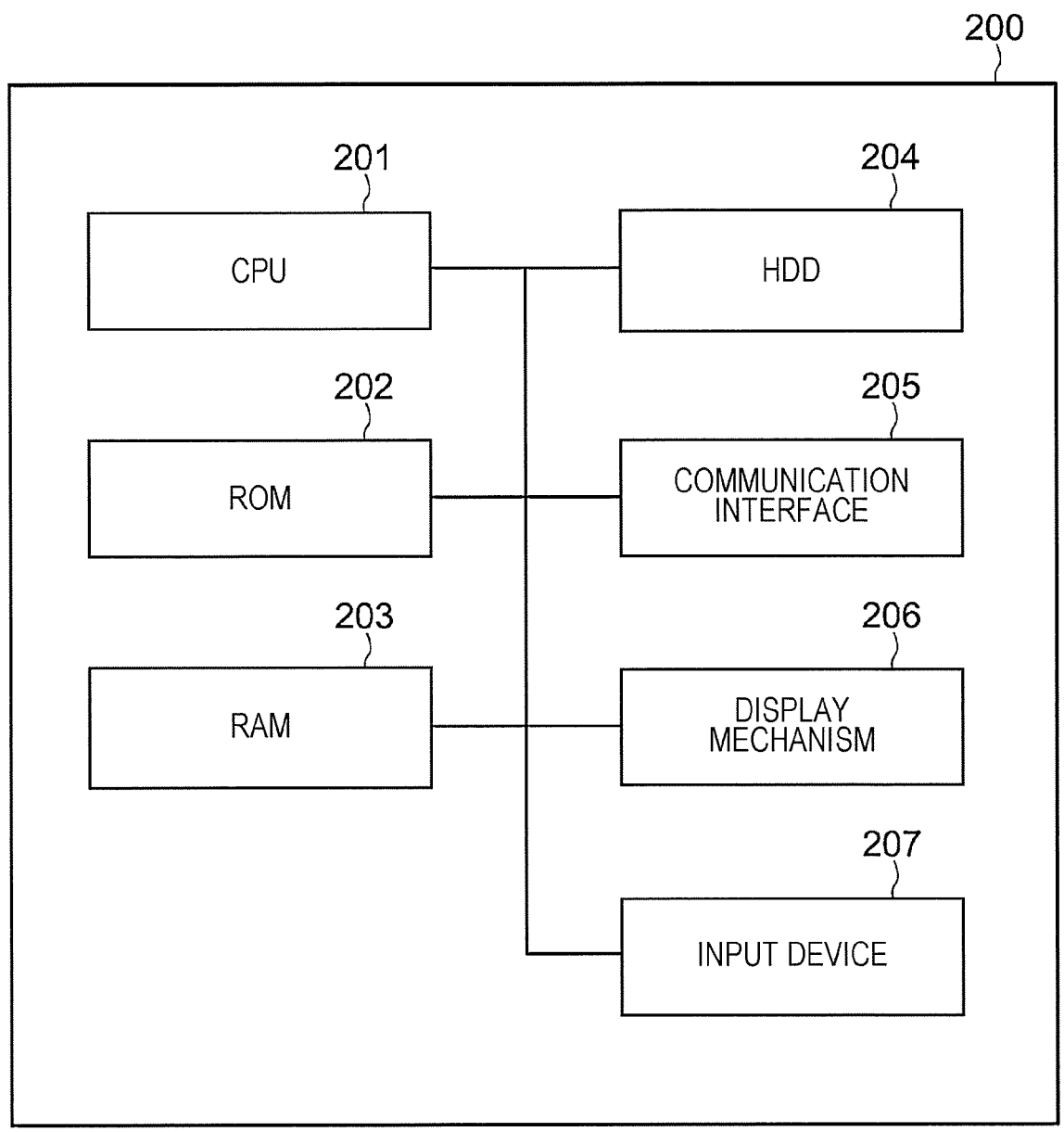
FIG. 10 is a diagram illustrating an example of the hardware configuration of a computer to which the exemplary embodiment is applied.

FIG. 10 is a diagram illustrating an example of the hardware configuration of the computer 200 to which the present exemplary embodiment is applied.

As illustrated in FIG. 10, the computer 200 includes a CPU 201, which is an arithmetic unit, a ROM 202, which is a storage area storing programs such as basic input/output system (BIOS), and a RAM 203, which is an area in which the programs are executed. The computer 200 also includes a hard disk drive (HDD) 204, which is a storage area storing various programs such as an operating system (OS) and applications, data input to the various programs, data output from the various programs, and the like. The programs stored in the ROM 202, the HDD 204, and the like are loaded into the RAM 203 and executed by the CPU 201 to achieve functions of the computer 200.

The computer 200 also includes a communication interface 205 for communicating with the outside, a display mechanism 206 such as a display, and an input device such as a keyboard, a mouse, or a touch panel.

A program for achieving the exemplary embodiment of the present disclosure may be provided using a communication unit or stored in a storage medium such as a compact disc read-only memory (CD-ROM) and provided.

Although an exemplary embodiment and various modifications have been described, the exemplary embodiment and the modifications may be combined together.

The present disclosure is not limited by the above exemplary embodiment in any way and may be implemented in various modes without deviating from the scope of the present disclosure.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a display unit configured to display a screen and receive a selection for selecting one of a predetermined number of setting items displayed in a first display part of the screen; and
   a processor coupled to the display unit and configured to control the display unit to:
      dispose the selected one setting item at an upper part of the screen and secures a display area directly below the selected one setting item;
      dispose setting information corresponding to the selected one setting item in a second display part, which is one of display parts obtained by vertically dividing the secured display area in two;
      display the predetermined number of setting items by excluding the selected one setting item in the first display part, which is another of the display parts obtained by vertically dividing the secured display area in two, wherein a number of setting items displayed on the screen is maintained even after the operator selects the setting item; and
      perform a function associated with copying in response to selecting one of the setting items.

2. The information processing apparatus according to claim 1,
   wherein the processor is further configured to control the display unit to display, in the first display part in accordance with a predetermined rule, the predetermined number of setting items excluding setting items displayed in the upper display part of the screen.

3. The information processing apparatus according to claim 2,
   wherein the predetermined rule is that a setting item relevant to the selected one setting item takes priority in display.

4. The information processing apparatus according to claim 2,
   wherein the predetermined rule is a rule determined in accordance with an operation history of the operator.

5. The information processing apparatus according to claim 4,
   wherein the predetermined rule is that a setting item frequently selected by the operator as a next one setting item for the selected one setting item takes priority in display.

6. The information processing apparatus according to claim 1,
   wherein, the display unit is configured to further receive a selection for selecting another one of the predetermined number of setting items displayed in the first display part of the screen,
   the processor is further configured to control the display unit to display the predetermined number of setting items excluding the selected two setting items in the first display part and setting information corresponding to a latest setting item selected by the operator in the second display part.

7. The information processing apparatus according to claim 6,
   wherein the processor is further configured to control the display unit to display, in the upper part of the screen, the selected two setting items in order of selection and setting information employed by the operator for each of the setting items selected by the operator.

8. The information processing apparatus according to claim 1,
   wherein, the processor is further configured to control the display unit to newly display, in the first display part, a setting item that has not been displayed on the screen before the setting item is selected.

9. An information processing apparatus comprising:
a display unit configured to display a list of a plurality of setting items and receive a selection for selecting one of the plurality of setting items on a screen on which the list is displayed;
a processor coupled to the display unit and configured to control the display unit to:
dispose the selected one setting item at an upper part of the screen and secures a display area directly below the selected one setting item;
dispose setting information corresponding to the selected one setting item in a second display part, which is one of display parts obtained by vertically dividing the secured display area in two;
display the predetermined number of setting items while excluding the selected one setting item in a first display part, which is another of the display parts obtained by vertically dividing the secured display area in two, to maintain a number of setting items displayed on the screen is maintained even after the operator selects the setting item by replacing the excluded selected one setting item in the first display part with another setting item belong to the first display part; and
perform a function associated with copying in response to selecting one of the setting items.

10. An information processing apparatus comprising:
a display unit configured to display a screen and receive a selection for selecting one of a predetermined number of setting items displayed in a first display part of the screen; and
a processor coupled to the display unit and configured to control the display unit to:
dispose the selected one setting item at an upper part of the screen and secures a display area directly below the selected one setting item;
dispose setting information corresponding to the selected one setting item in a second display part, which is one of display parts obtained by vertically dividing the secured display area in two;
newly display another setting item in the first display part, which is another of the display parts obtained by vertically dividing the secured display area in two, without displaying the selected one setting item, wherein a number of setting items displayed on the screen is maintained even after the operator selects the setting item; and
perform a function associated with copying in response to selecting one of the setting items.

\* \* \* \* \*